US012809662B2

(12) United States Patent
Sakuragi

(10) Patent No.: US 12,809,662 B2
(45) Date of Patent: Nov. 24, 2026

(54) COMPUTER READABLE MEDIUM, MANAGEMENT DEVICE, MANAGEMENT METHOD, AND MANAGEMENT SYSTEM

(71) Applicant: BROTHER KOGYO KABUSHIKI KAISHA, Nagoya (JP)

(72) Inventor: Yuichiro Sakuragi, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 613 days.

(21) Appl. No.: 18/050,159

(22) Filed: Oct. 27, 2022

(65) Prior Publication Data

US 2023/0143404 A1 May 11, 2023

(30) Foreign Application Priority Data

Nov. 5, 2021 (JP) ................................ 2021-181401

(51) Int. Cl.

*G06F 9/48* (2006.01)
*G06F 9/50* (2006.01)
*H04L 41/08* (2022.01)
*H04L 41/0806* (2022.01)
*H04L 41/084* (2022.01)

(Continued)

(52) U.S. Cl.

CPC .............. *G06F 9/4843* (2013.01); *G06F 9/48* (2013.01); *G06F 9/50* (2013.01); *G06F 9/5005* (2013.01); *G06F 9/5027* (2013.01); *H04L 41/08* (2013.01); *H04L 41/0806* (2013.01);

(Continued)

(58) Field of Classification Search

CPC . G06F 9/48; G06F 9/4843; G06F 9/50; G06F 9/5005; G06F 9/5027; H04L 41/08; H04L 41/0806; H04L 41/084; H04L 41/0843; H04L 41/085; H04L 41/22

See application file for complete search history.

(56) References Cited

U.S. PATENT DOCUMENTS 9,983,855 B1 * 5/2018 Grigoryan ................. G06F 8/34
2014/0380409 A1 * 12/2014 Ohashi .................... H04L 63/20 726/1

(Continued)

FOREIGN PATENT DOCUMENTS

JP 2005293476 A 10/2005
JP 2013243551 A 12/2013
JP 2019148957 A 9/2019

*Primary Examiner* — Charles M Swift
(74) *Attorney, Agent, or Firm* — Scully, Scott, Murphy & Presser, P.C.

(57) ABSTRACT

A non-transitory computer readable medium stores a management program to be used in a management system that manages a plurality of terminal devices. The management system includes a storage device, a management device and communicate with the storage device, and a communication terminal device configured to communicate with the storage device. The management program is configured to cause a controller included in the management device to execute a process including storing, in the storage device, the task request data for requesting, as the task, creation of a setting value file which includes setting values of the one of the terminal devices corresponding to given setting items, acquiring the setting value file from the storage device, and extracting one of the setting values corresponding to one of the given setting items from the setting value file.

11 Claims, 12 Drawing Sheets

(51) Int. Cl.
*H04L 41/085* (2022.01)
*H04L 41/22* (2022.01)

(52) U.S. Cl.
CPC ........ *H04L 41/084* (2013.01); *H04L 41/0843* (2013.01); *H04L 41/085* (2013.01); *H04L 41/22* (2013.01)

(56) References Cited

U.S. PATENT DOCUMENTS

| | | | | |
|---|---|---|---|---|
| 2015/0189116 | A1* | 7/2015 | Ito | H04N 1/00928 358/1.13 |
| 2017/0048416 | A1* | 2/2017 | Cho | G06F 3/1292 |
| 2019/0146722 | A1* | 5/2019 | Grohs | H04N 1/00244 358/1.13 |
| 2020/0249883 | A1* | 8/2020 | Nakata | G06F 3/1257 |
| 2020/0293245 | A1* | 9/2020 | Tanaka | G06F 3/1293 |
| 2020/0364018 | A1* | 11/2020 | Sato | G06F 3/1293 |

* cited by examiner

FIG. 5A

| PartitionKey | RowKey | DeviceId | NotifyParameter | Progress | Source |
|---|---|---|---|---|---|
| status or log or registration | | DEVICE ID | | request or processing or done | device or client |

FIG. 5B

T1

```
{
"x.x.x.x.x.x.x.x.x.x.x.x.x.x.x.x.x.x": "%MIB(x.x.x.x.x.x.x.x.x.x.x.x.x.x.x.x.x.x.x)%",
"y.y.y.y.y.y.y.y.y.y.y.y.y": "%MIB(y.y.y.y.y.y.y.y.y.y.y.y.y.y)%",
"z.z.z.z.z.z.z.z.z.z.z.z.z": "%MIB(z.z.z.z.z.z.z.z.z.z.z.z.z.z)%",
....
```

FIG. 5C

T2

```
{
"x.x.x.x.x.x.x.x.x.x.x.x.x.x.x.x.x.x": "9876543210987···",
"y.y.y.y.y.y.y.y.y.y.y.y.y": "40000",
"z.z.z.z.z.z.z.z.z.z.z.z.z": "Sleep",
....
```

FIG. 6A

| PartitionKey | RowKey | DeviceId | NotifyParameter | Progress | Source |
|---|---|---|---|---|---|
| instanttask | TRANSACTION ID | DEVICE ID | PROCESS CONTENTS | request or processing or done | |

FIG. 6B

T3

{
"ActionType" : "1",
"FileOutputFile" : "Folder/setting.edpk"
}

COMPUTER READABLE MEDIUM, MANAGEMENT DEVICE, MANAGEMENT METHOD, AND MANAGEMENT SYSTEM

REFERENCE TO RELATED APPLICATIONS

This application claims priority from Japanese Patent Application No. 2021-181401 filed on Nov. 5, 2021. The entire content of the priority application is incorporated herein by reference.

BACKGROUND ART

A related art discloses a management system in which a management device manages an image forming device via a server.

DESCRIPTION

In a management system in which a management device manages a terminal device such as an image forming device, it is desirable to improve efficiency of data transmission between the management device and the terminal device via a server in order to transmit and receive various data between the management device and the terminal device.

An aspect of the present disclosure relates to a management program to be used in a management system that manages a plurality of terminal devices, and the management program is configured to cause a controller included in a management device to execute a request registration process, a file acquisition process, and an extraction process. The management program may be stored in a computer readable medium.

The management system includes the management device, a storage device, and a communication terminal device. The management device manages the terminal devices. The storage device is configured to communicate with the management device. The communication terminal device is the terminal device configured to communicate with the storage device. The management device is configured to register, in the storage device, task request data for requesting the terminal device to execute a task. The communication terminal device is configured to, when a communication terminal acquisition timing arrives, acquire, from the storage device, the task request data whose request target is the communication terminal device, and further execute the task based on the acquired task request data.

The request registration process is to store, in the storage device, the task request data for requesting, as the task, creation of a setting value file which includes a setting value set in the terminal device for each of a plurality of preset setting items.

The file acquisition process is to acquire the setting value file from the storage device.

The extraction process is to extract the setting values of the necessary setting items from the setting value file acquired by the file acquisition process.

According to the management program according to the present disclosure configured as described above, an acquisition target designation file in which the necessary setting items are described does not need to be uploaded from the management device to the storage device, and thus efficiency of data transmission is improved.

Another aspect of the present disclosure relates to a management device to be used in a management system that is configured to manage a plurality of terminal devices, and the management device is configured to execute a request registration process, a file acquisition process, and an extraction process.

The management device according to the present disclosure is a device controlled by the management program according to the present disclosure, and has the same effects as those of the management program according to the present disclosure.

Still another aspect of the present disclosure relates to a management method used in a management device in a management system that manages a plurality of terminal devices, and the management method includes a request registration step, a file acquisition step, and an extraction step.

The management method according to the present disclosure is a method executed by the management program according to the present disclosure, and has the same effects as those of the management program according to the present disclosure.

Still another aspect of the present disclosure relates to a management system that manages a plurality of terminal devices, and the management device is configured to execute a request registration process, a file acquisition process, and an extraction process.

The management system according to the present disclosure is a system controlled by the management program according to the present disclosure, and has the same effects as those of the management program according to the present disclosure.

FIGS. 5A to 5C are explanatory diagrams of an example of a scheduled task table.

FIGS. 6A and 6B are explanatory diagrams of an example of an instant task table.

FIRST EMBODIMENT

Figure 1:
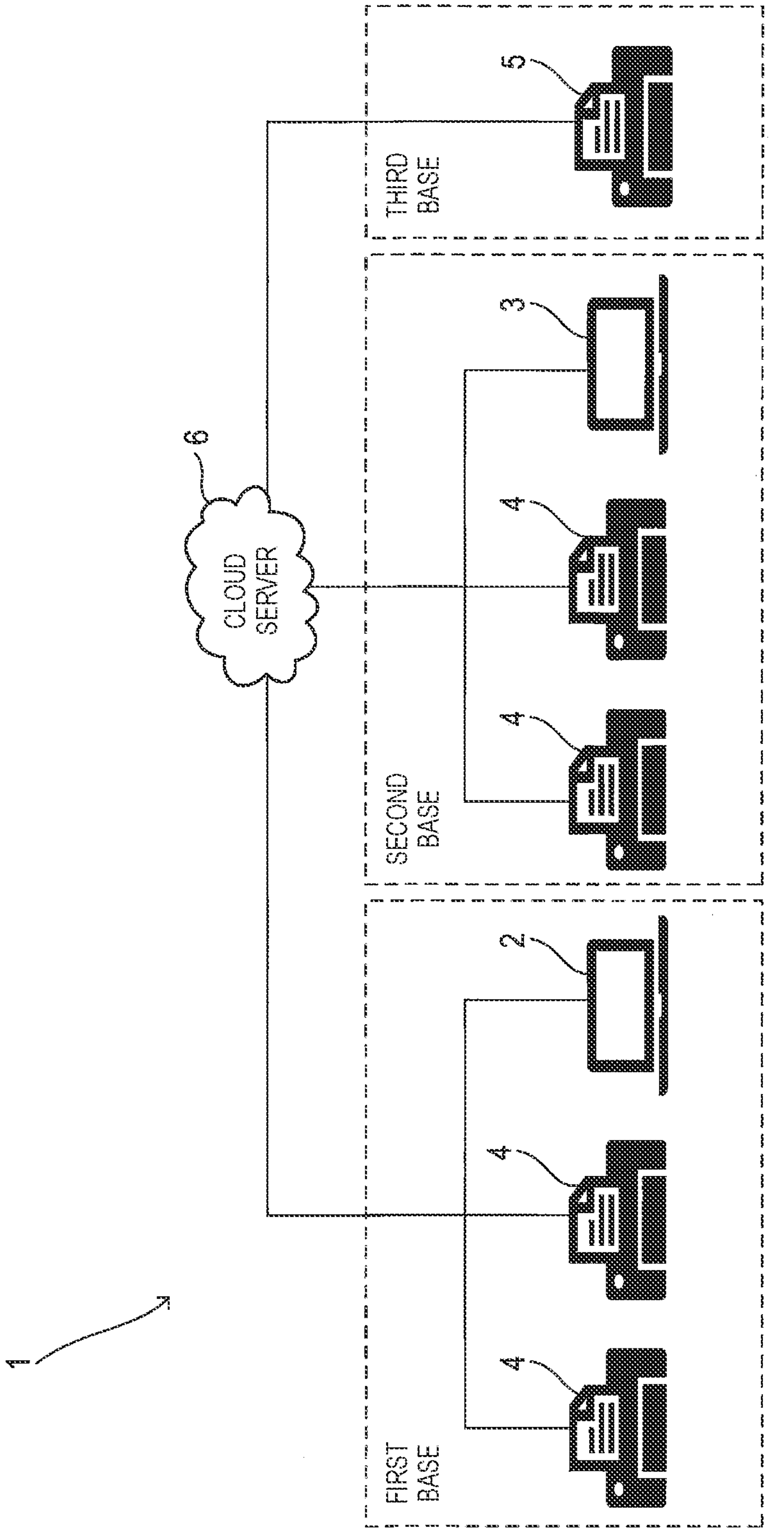
FIG. 1 is a block diagram showing a configuration of a management system.

Hereinafter, a first embodiment of the present disclosure will be described with reference to the drawings.

(1) Overall Configuration

A management system 1 according to the present embodiment is a network system configured to manage terminal devices 4 and 5 via a cloud server 6 by cooperation of a master 2 and a client 3, and the terminal devices 4 and 5 are disposed in a plurality of bases.

As shown in FIG. 1, the master 2 communicates, via a local area network, with the terminal devices 4 installed in a first base. Further, the master 2 communicates with the cloud server 6 via a wide area network.

The client 3 communicates, via a local area network, with the terminal devices 4 installed in a second base. Further, the client 3 communicates with the cloud server 6 via a wide area network. The terminal device 5 installed in a third base communicates with the cloud server 6 via a wide area network.

The local area network may include, for example, at least one of a wireless LAN and a wired LAN. The wide area network may include, for example, the Internet. A local area network may be constructed in the third base. In this case, the terminal device 5 may be connected to the wide area network via the local area network in the third base.

Each of the terminal devices 4 cannot use a cloud service provided by the cloud server 6. In other words, the terminal device 4 does not have a function of communicating with the cloud server 6. Hereinafter, the terminal device 4 is particularly referred to as a first type terminal device 4. On the other hand, the terminal device 5 is a terminal device that may use a cloud service provided by the cloud server 6. In other words, the terminal device 5 has a function of communicating with the cloud server 6. Hereinafter, the terminal device 5 is particularly referred to as a second type terminal device 5.

The first type terminal device 4 installed in the second base is managed by the master 2 via the client 3 and the cloud server 6. The second type terminal device 5 installed in the third base is managed by the master 2 via the cloud server 6 rather than via the client 3.

The terminal devices 4 and 5 managed by the master 2 may be, for example, a group of terminal devices managed by an organization such as a company. In this case, the bases may be activity bases of the organization. For example, the first base where the master 2 is present may be an office having an organization management department. The other second and third bases may be branch offices of the organization separated from the first base.

Examples of the terminal devices 4 and 5 include a printer, a scanner, a digital multifunction device in which these functions are integrated, and the like. The master 2 and the client 3 are each implemented, for example, by installing a dedicated computer program in a personal computer.

(2) Device Configuration

Figure 2:
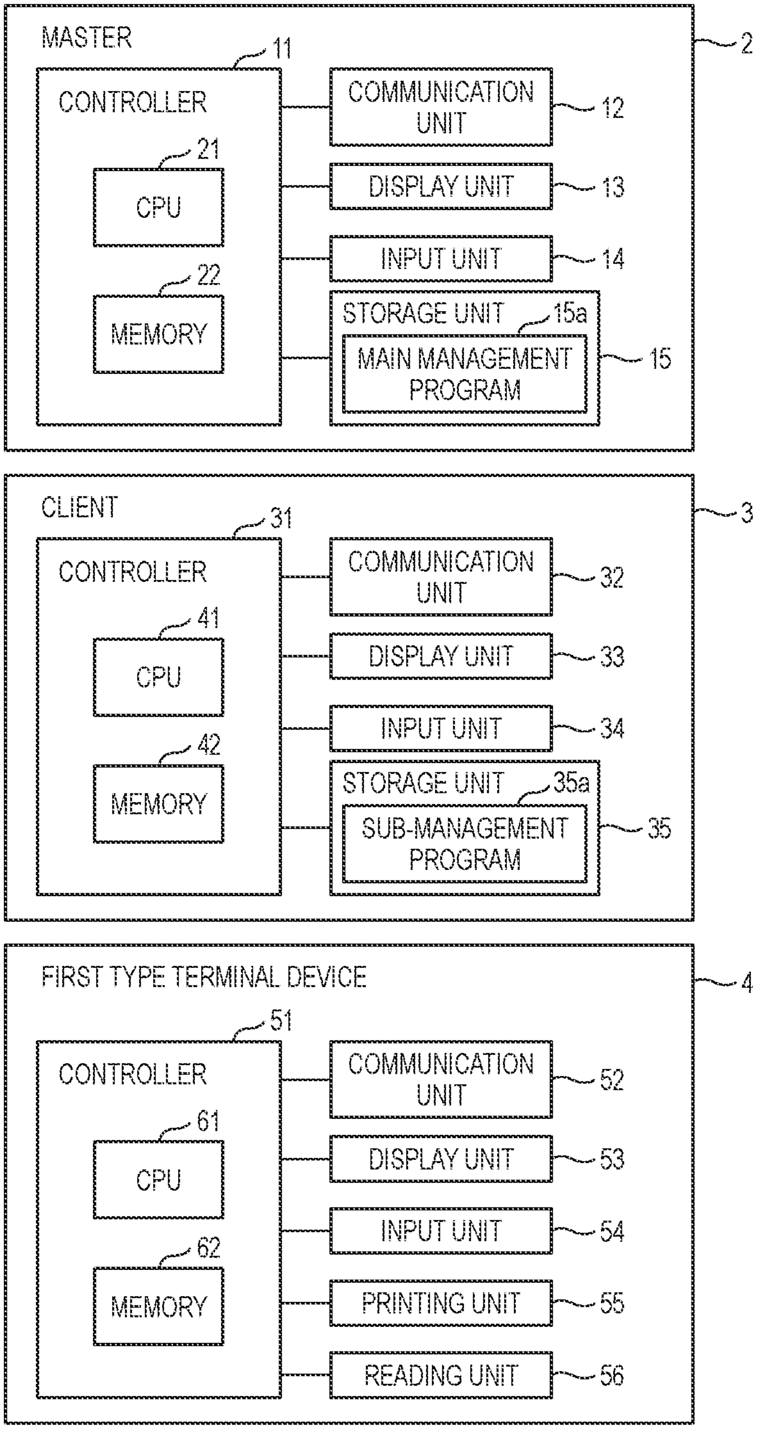
FIG. 2 is a block diagram showing configurations of a master, a client, and a first type terminal device.

As shown in FIG. 2, the master 2 includes a controller 11, a communication unit 12, a display unit 13, an input unit 14, and a storage unit 15. The controller 11 includes a CPU 21 and a memory 22. The CPU 21 serving as a processor executes a process in accordance with a computer program stored in the storage unit 15. The memory 22 is used as a work memory when the above process is executed.

The storage unit 15 includes, for example, a storage such as a solid state drive and a hard disk drive, and stores various computer programs and data. The storage unit 15 stores a main management program 15*a*. The main management program 15*a* is a computer program for causing the CPU 21 to implement a management function to be implemented by the master 2. It may be understood that a process mainly executed by the controller 11 in the following description is implemented by the process executed by the CPU 21 in accordance with the computer program.

The communication unit 12 is connected to the local area network in the base where the master 2 is present, and is further connected to the wide area network. The communication unit 12 may be connected to the wide area network via a router (not shown). The display unit 13 displays various screens for a user who operates the master 2. Examples of the display unit 13 include a liquid crystal display. Examples of the various screens include a screen for displaying log information and status information of each of the terminal devices 4 and 5 to be managed, and a screen for remotely operating the terminal devices 4 and 5 in accordance with an operation signal from the user.

The input unit 14 includes one or more input devices via which an operation signal from the user who operates the master 2 is input, such as a keyboard and a pointing device. The controller 11 operates in accordance with an operation signal input via the input unit 14.

The client 3 includes a controller 31, a communication unit 32, a display unit 33, an input unit 34, and a storage unit 35. The controller 31 includes a CPU 41 and a memory 42. The CPU 41 serving as a processor executes a process in accordance with a computer program stored in the storage unit 35.

The storage unit 35 stores a sub-management program 35*a*. The sub-management program 35*a* is a computer program for causing the CPU 41 to implement a function related to the management function of the master 2, which is to be implemented by the client 3. It may be understood that a process mainly executed by the controller 31 in the following description is implemented by the process executed by the CPU 41 in accordance with the computer program.

The communication unit 32 is connected to the local area network in the base where the client 3 is present, and is further connected to the wide area network. The communication unit 32 may be connected to the wide area network via a router (not shown). The display unit 33 includes, for example, a liquid crystal display, and displays various screens for a user who operates the client 3. The input unit 34 includes one or more input devices via which an operation signal from the user who operates the client 3 is input. The controller 31 operates in accordance with an operation signal input via the input unit 34.

The first type terminal device 4 includes a controller 51, a communication unit 52, a display unit 53, and an input unit 54. When the first type terminal device 4 is the digital multifunction device, the first type terminal device 4 may further include a printing unit 55 and a reading unit 56. The first type terminal device 4 may include only one of the printing unit 55 and the reading unit 56.

The controller 51 includes a CPU 61 and a memory 62. The memory 62 may include a nonvolatile memory such as a flash memory in addition to a RAM, and the nonvolatile memory may store a computer program, setting data, and the like.

The CPU 61 serving as a processor executes overall control of the entire first type terminal device by executing a process in accordance with a computer program stored in the memory 62. It may be understood that a process mainly executed by the controller 51 in the following description is implemented by the process executed by the CPU 61 in accordance with the computer program.

The communication unit 52 is connected to the local area network in the base where the first type terminal device 4 is present, so that the communication unit 52 can communicate with the master 2 or the client 3 present in the base. The display unit 53 includes, for example, a liquid crystal display, and displays various screens for a user who operates the first type terminal device 4. The input unit 54 includes one or more input devices such as a touch panel on a liquid crystal display in order to input an operation signal from the user.

The printing unit 55 prints an image on a sheet under control of the controller 51. Examples of the printing unit 55 include an inkjet printer and a laser printer. According to the present embodiment, status information such as a remaining amount of a color material and log information such as the number of printed sheets are provided from the first type terminal device 4 to the master 2 via the client 3 and the cloud server 6 by a method to be described later. The reading unit 56 reads a reading target such as a printed matter under control of the controller 51.

Figure 3:
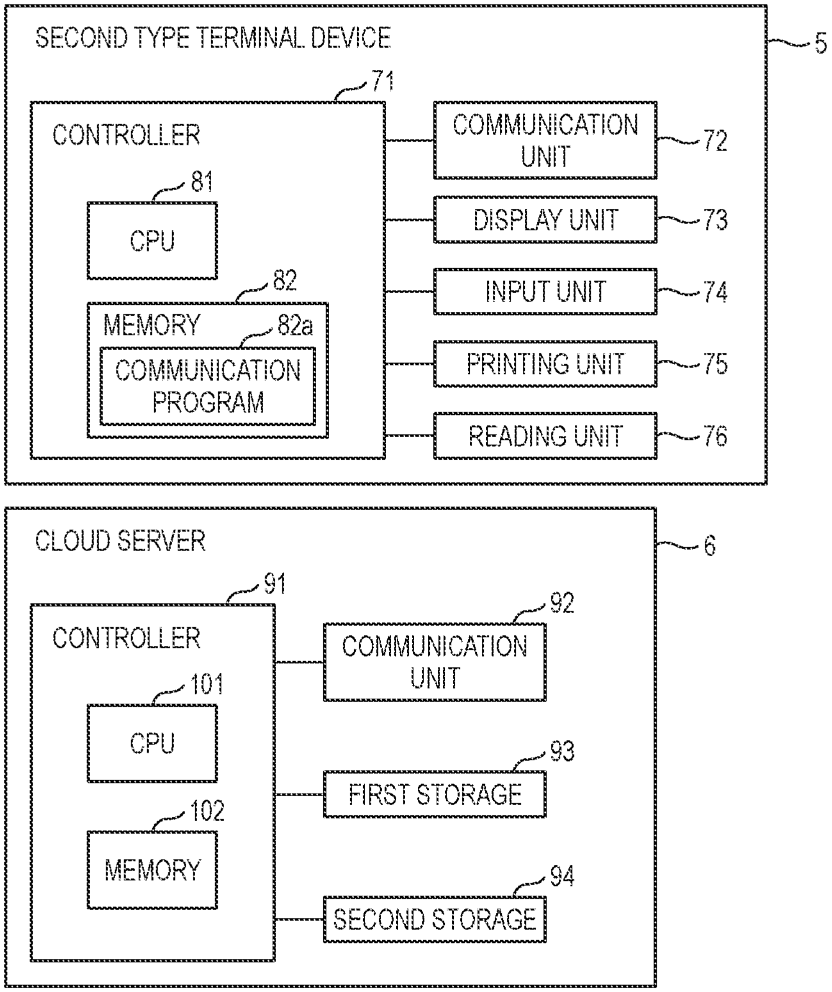
FIG. 3 is a block diagram showing configurations of a second type terminal device and a cloud server.

As shown in FIG. 3, the second type terminal device 5 includes a controller 71, a communication unit 72, a display unit 73, and an input unit 74. When the second type terminal device 5 is the digital multifunction device, the second type terminal device 5 may further include a printing unit 75 and a reading unit 76. The second type terminal device 5 may include only one of the printing unit 75 and the reading unit 76.

The controller 71 includes a CPU 81 and a memory 82. The memory 82 may include a nonvolatile memory such as a flash memory, and the nonvolatile memory may store a computer program, setting data, and the like.

The CPU 81 serving as a processor executes overall control of the entire device by executing a process in accordance with a computer program stored in the memory 82. The memory 82 stores a communication program 82*a*. The communication program 82*a* is a program for using a cloud service provided by the cloud server 6. It may be understood that a process mainly executed by the controller 71 in the following description is implemented by the process executed by the CPU 81 in accordance with the computer program.

The communication unit 72 is connected to the wide area network, so that the communication unit 72 can communicate with the cloud server 6. When the local area network is constructed in the third base, the communication unit 72 may be connected to the wide area network via the local area network. The display unit 73 includes, for example, a liquid crystal display. The input unit 74 includes one or more input devices via which an operation signal from a user is input.

The printing unit 75 prints an image on a sheet under control of the controller 71. According to the present embodiment, status information such as a remaining amount of a color material and log information such as the number of printed sheets are provided from the second type terminal device 5 to the master 2 via the cloud server 6 by a method to be described later. The reading unit 76 reads a reading target such as a printed matter under control of the controller 71.

The cloud server 6 includes a controller 91, a communication unit 92, a first storage 93, and a second storage 94. The controller 91 includes a CPU 101 and a memory 102.

The CPU 101 serving as a processor executes a process in accordance with a computer program stored in the memory 102. The process executed by the CPU 101 includes a process of causing the cloud server 6 to function as a cloud storage. It may be understood that a process mainly executed by the controller 91 in the following description is implemented by the process executed by the CPU 101 in accordance with the computer program.

The above cloud storage includes a table storage and an object storage. The controller 91 executes the above process, so that the first storage 93 functions as the table storage, and the second storage 94 functions as the object storage.

The exemplary first storage 93 functions as a NoSQL data store, and may store a table having a group of schema-less entities as constituent elements. Each entity in the table includes a set of properties.

The exemplary second storage 94 functions as the object storage into which any text file and binary file may be read and written as objects from an outside by using an HTTP/HTTPS protocol.

Azure of Microsoft Corporation is known as a cloud service that provides the table storage and the object storage described above. The cloud server 6 may operate in the same manner as such a cloud service. Azure is a registered trademark of Microsoft Corporation.

(3) Sequence Outline

Next, an operation sequence related to management will be schematically described.

When the main management program 15*a* is installed in the master 2, the controller 11 of the master 2 executes a process in accordance with the main management program 15*a*. That is, the master 2 has the management function.

Figure 4A:
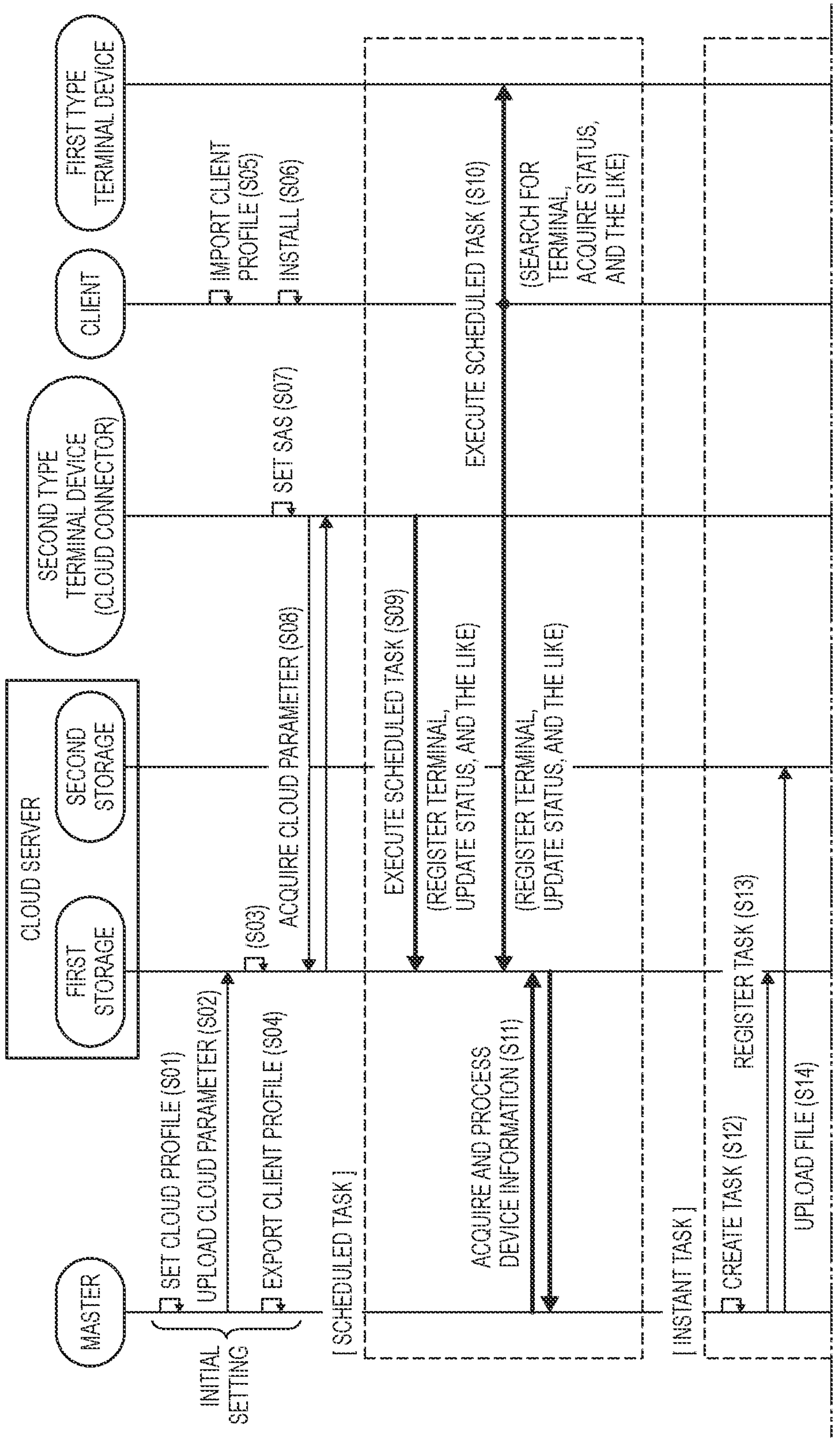
FIGS. 4A and 4B are explanatory diagrams showing an example of a management sequence executed by the management system.

As shown in FIG. 4A, the master 2 first executes a process of setting a cloud profile in S01. For example, the master 2 sets the cloud profile in accordance with a setting operation executed by a main administrator via the input unit 14.

Setting of the cloud profile includes setting a cloud parameter. The cloud parameter includes an initial setting parameter. As will be described later, the client 3 and the second type terminal device 5 execute a polling operation for the cloud server 6 and an update operation of information stored in the cloud server 6. The polling operation is an operation of periodically confirming the presence or absence of an instant task to be described later. The update operation of the information is an operation defined by a scheduled task to be described later.

The initial setting parameter includes, for example, a cycle of the polling operation (hereinafter, referred to as a polling cycle) and a cycle of the update operation of the information (hereinafter, referred to as an information update cycle). A plurality of types of information update cycles are set according to types of information to be updated.

The cloud parameter may further include a scheduled task template. The scheduled task template defines process contents of the scheduled task to be executed by each of the terminal devices 4 and 5. The above information update cycle corresponds to an execution cycle of one or more processes in the scheduled task.

The scheduled task template and a scheduled task table are present individually. That is, in the first storage 93, the scheduled task template is written into a first storage area, and the scheduled task table is written into a second storage area different from the first storage area.

The setting of the cloud profile further includes setting a shared access signature (hereinafter, referred to as SAS) for using the cloud service. SAS is an abbreviation for shared access signature.

The SAS is individually set for each of the first storage 93 and the second storage 94 (that is, the table storage and the object storage). In the setting of the cloud profile in the master 2, the main administrator sets, as a part of the cloud profile, the SAS which is set in each of the first storage 93 and the second storage 94, so that the master 2 can access the first storage 93 and the second storage 94.

The same SAS is also set when the main management program 15*a* is installed in the master 2. When the master 2 accesses the cloud server 6, the SAS set in the master 2 is transmitted to the cloud server 6. When the transmitted SAS matches a SAS of an access destination set in the cloud server 6, communication (that is, reading and writing of data) with the access destination is possible.

As shown in S02, the master 2 uploads the cloud parameter according to the set cloud profile to the first storage 93 of the cloud server 6 in accordance with an operation of the main administrator. As a result, as shown in S03, the uploaded cloud parameter is written into the first storage 93.

As shown in SO4, the master 2 exports at least a part of the cloud profile as a client profile (that is, data to be read by the client 3). For example, the client profile may include at least one of the initial setting parameters, the scheduled task template, and the SAS described above.

The client profile exported by the master 2 is provided to the client 3. The client profile may be provided to the client 3 by any method. For example, the client profile may be transmitted from the master 2 to the client 3 by an e-mail or other methods.

As shown in S06, a sub-administrator operates the client 3 and installs the sub-management program 35*a* in the client 3. At this time, as shown in S05, the client profile provided from the master 2 is imported into the client 3 by an operation of the sub-administrator. That is, various types of data set in the client profile are appropriately set in the client 3. For example, the SAS, the polling cycle, the information update cycle, and the like set in the client profile are imported and set in the client 3. The above scheduled task template may be imported.

When the sub-management program 35*a* is installed and the client profile is set as described above, the client 3 may use the cloud server 6. As a result, information may be transmitted between the client 3 and the master 2 via the cloud server 6. The client 3 may execute a management relay function via the cloud server 6. The management relay function includes a task execution instruction from the master 2 to the first type terminal device 4, and transmission of the log information and the status information from the first type terminal device 4 to the master 2, and is a function of relaying information between the master 2 and the first type terminal device 4.

As shown in S07, a SAS is registered in the second type terminal device 5 by an input operation performed by an administrator (hereinafter, referred to as a device administrator) of the second type terminal device 5.

Registration of the SAS in the second type terminal device 5 may be executed, for example, via the input unit 74 of the second type terminal device 5. For example, the SAS may be registered in the second type terminal device 5 from an information processing device different from the second type terminal device 5. Specifically, a predetermined web server may be built in the second type terminal device 5. The SAS may be registered in the second type terminal device 5 by accessing the web server from the information processing device different from the second type terminal device 5, inputting the SAS via a user interface in the information processing device, and transmitting the SAS to the web server.

The controller 71 of the second type terminal device 5 in which the SAS is registered executes a process in accordance with the communication program 82*a*. The controller 71 that executes the process in accordance with the communication program 82*a* is hereinafter referred to as a cloud connector. As shown in S08, the cloud connector accesses the first storage 93 of the cloud server 6 by using the SAS, and refers to the cloud parameter written by the master 2.

The cloud connector acquires the cloud parameter and sets the cloud parameter in an own device.

When the cloud connector accesses the cloud server 6, the SAS of an access source is transmitted from the cloud connector to the cloud server 6. When the transmitted SAS matches the SAS of the access destination set in the cloud server 6, communication (that is, reading and writing of data) with the access destination is possible.

When initial setting including setting of the cloud parameter and the SAS described above (that is, processes of S07 and S08) is completed, the second type terminal device 5 (that is, the cloud connector) periodically executes the scheduled task according to the set information update cycle as shown in S09.

When the initial setting including the setting of the cloud parameter and the SAS described above (that is, the processes of S07 and S08) is completed, as shown in S10, the client 3 periodically executes, according to the set information update cycle, the scheduled task of updating the information stored in the first storage 93 of the cloud server 6.

When corresponding device information is not registered in the first storage 93, the scheduled task to be executed by the cloud connector first starts from registering the device information in the first storage 93. The device information corresponding to the cloud connector is predetermined information indicating the second type terminal device 5 mounted with the cloud connector.

When there is the first type terminal device 4 whose corresponding device information is not registered in the first storage 93 among the first type terminal devices 4 to be managed, the scheduled task to be executed by the client 3 starts from registering in the first storage 93 the device information of the first type terminal device 4 whose device information is not registered. The device information of the first type terminal device 4 is predetermined information indicating the first type terminal device 4.

The first storage 93 includes the scheduled task table as one table. The scheduled task table includes a group of one or more entities. One entity includes a plurality of properties. In the present embodiment, the plurality of properties include "Partition Key", "Row Key", "Device Id", "Notify Parameter", "Progress", and "Source", as shown, for example, in FIG. 5A.

The scheduled task table includes three entities related to "log", "status", and "registration" for each of the terminal devices 4 and 5. That is, in the present embodiment, there is an individual scheduled task table (hereinafter, referred to as an individual table) for each of the terminal devices 4 and 5 to be managed, and the scheduled task table may be regarded as a collection of these individual tables. Each individual table includes three entities related to "log", "status", and "registration" of a corresponding one of the terminal devices 4 and 5.

When the corresponding terminal device is the first type terminal device 4, information in the entity is updated by the client 3 that manages the first type terminal device 4. When the corresponding terminal device is the second type terminal device 5, information in the entity is updated by the cloud connector of the second type terminal device 5.

In a case of the entity related to the "log", "log", which is a character string indicating the "log", is stored in the property "Partition Key". The entity related to the "log" stores, in the property "Notify Parameter", log information of a terminal device corresponding to a device ID stored in the property "Device Id". The device ID is identification information unique to each of the terminal devices 4 and 5.

When the corresponding terminal device is the printer or the digital multifunction device, the log information may include information indicating the total number of printed sheets of the corresponding terminal device. The log information may include, as a print history, information that indicates a user who issues a print command and the number of printed sheets for each print job.

In a case of the entity related to the "status", "status", which is a character string indicating the "status", is stored in the property "Partition Key". The entity related to the "status" stores, in the property "Notify Parameter", status information of the terminal device corresponding to the device ID stored in the property "Device Id". When the corresponding terminal device is the printer or the digital multifunction device, the status information may include information about a remaining amount of a color material and error information such as a sheet jam of the corresponding terminal device.

In a case of the entity related to the "registration", "registration", which is a character string indicating the "registration", is stored in the property "Partition Key". The entity related to the "registration" stores, in the property "Notify Parameter", device information of the terminal device corresponding to the device ID stored in the property "Device Id". The device information includes a plurality of items that describes a basic configuration of a device.

The device ID of the device whose entity is updated is stored in the property "Device Id".

A character string, which is described in a JSON format in order to indicate instruction contents of the scheduled task, is stored in the property "Notify Parameter".

For example, in the property "Notify Parameter" in the entity related to the "status", a character string is described in a JSON format so as to associate an object identifier (hereinafter, referred to as an OID) used in a management information base (hereinafter, referred to as a MIB) of a corresponding parameter with a value of the object identifier. A description of "x.x.x.x.x . . . " and "y.y.y.y.y . . . " shown in a task instruction T1 in FIG. 5B is an abstract representation showing an example of the object identifier. MIB is an abbreviation for management information base.

An instruction on a second row in the task instruction T1 is '"x.x.x.x . . . ": "% MIB(x.x.x.x . . . )%"'. The above "x.x.x.x . . . " is an object ID of a MIB.

An instruction on a third row in the task instruction T1 is '"y.y.y.y . . . ": "% MIB(y.y.y.y . . . )%"'. The above "y.y.y.y . . . " is an object ID of a MIB.

When the above "x.x.x.x . . . " is expressed as Oid1, the instruction on the second row is '"Oid1": "% MIB(Oid1)%"'. "% MIB(Oid1)%" is an instruction to acquire a value corresponding to Oid1 which is the object ID and to overwrite "% MIB(Oid1)%" with the acquired value. Therefore, when the value corresponding to Oid1 is "XXXXXXX", '"Oid1": "% MIB(Oid1)%"' is rewritten to '"Oid1": "XXXXXXX"' in registered data.

Similarly, when "y.y.y.y . . . " which is the object ID is expressed as Oid2, the instruction on the third row is '"Oid2": "% MIB(Oid2)%"'.

A description of "x.x.x.x.x . . . " and "y.y.y.y.y . . . " shown in a task result T2 in FIG. 5C is an abstract representation showing an example of an update result.

In each of the entities related to the "log" and the "registration", a character string in the property "Notify Parameter" is also rewritten in the same manner as that in the entity related to the "status".

The property "Progress" is stored with character strings each indicating a progress status, such as a character string "done" indicating that a task is completed, a character string "request" indicating that execution of an instruction is requested, and a character string "processing" indicating that the task is being executed.

The property "Source" indicates a type of a device whose entity is updated. When the entity is updated by the client 3, "client", which is a character string indicating the client 3, is stored in the property "Source" in the entity. When the entity is updated by the cloud connector, "device", which is a character string indicating the second type terminal device 5, is stored in the property "Source" in the entity.

The entity of the cloud connector of the second type terminal device 5 is updated by the cloud connector. The entity of the first type terminal device 4 is updated by the client 3 which is connected, together with the first type terminal device 4, to the same local area network. That is, the client 3 updates the entity of each of the first type terminal devices 4 subordinate to the client 3 (that is, the first type terminal devices 4 that are management relay targets). Identification information of the client 3 whose management relay targets are the first type terminal devices 4 may be written as a part of the device information into the registration entity of the first type terminal device 4.

The client 3 communicates with each of the first type terminal devices 4 that are the management relay targets in the same local area network, and acquires, from each of the first type terminal devices 4, information necessary for updating the device information. The client 3 may update the registration entity of the corresponding first type terminal device 4 based on the acquired information.

Further, the client 3 periodically communicates, via the local area network, with each of the first type terminal devices 4 that are the management relay targets, and acquires corresponding log information and status information. The client 3 may update the log entity and the status entity of the corresponding first type terminal device 4 based on the acquired log information and the acquired status information.

The cloud connector of the second type terminal device 5 may periodically access the cloud server 6, and may update the log entity and the status entity of the second type terminal device 5 based on the log information and the status information of the second type terminal device 5.

The master 2 also functions as the client 3. That is, it may be understood that the master 2 functions as the client 3 for the first type terminal devices 4 in the first base. Specifically, in the scheduled task table in the first storage 93 of the cloud server 6, the three entities related to the "log", the "status", and the "registration" are generated corresponding to each of the first type terminal devices 4 (hereinafter, referred to as "master subordinate terminal devices") in the first base. Similarly to the client 3, the master 2 may acquire various types of information from each of the master subordinate terminal devices, and update the registration entity, the log entity, and the status entity of each corresponding master subordinate terminal device.

Further, as shown in S11 in FIG. 4A, the master 2 periodically accesses the first storage 93 of the cloud server 6 and refers to the log entity, the status entity, and the registration entity of each of the terminal devices 4 and 5. Based on these references, the master 2 may execute a process of storing the log information, the status information, and the device information of each of the terminal devices 4 and 5 in the storage unit 15.

Further, the master 2 may display a list of the registered terminal devices 4 and 5 or display the log information and the status information of each of the terminal devices 4 and 5 on a screen of the display unit 13 in accordance with the operation signal which is output from the input unit 14 by an operation of the user. As described above, the management system 1 may remotely monitor, in the base where the master 2 is installed, states of the terminal devices 4 and 5 used in the plurality of bases.

As shown in S12, the master 2 receives an execution request operation for the instant task from the main administrator in accordance with an operation signal which is output from the input unit 14 by an operation of the main administrator, and generates, in accordance with the execution request operation, data indicating an entity of the instant task (hereinafter, referred to as an instant task entity). The instant task is a non-periodic task other than the scheduled task.

Further, as shown in S13, the master 2 may register the corresponding instant task entity in the first storage 93 by transmitting the created data to the cloud server 6.

The instant task entity is registered in the first storage 93 in a form of, for example, an instant task table shown in FIG. 6A.

Similarly to the scheduled task table, the instant task table includes properties of "Partition Key", "Row Key", "Device Id", "Notify Parameter", "Progress", and "Source".

Here, "instant task", which is a character string indicating an instant task, is stored in the property "Partition Key".

A respective transaction ID for identifying each instant task is stored in the property "Row Key".

A device ID for identifying the first type terminal device 4 or the second type terminal device 5 that is an instruction destination is stored in the property "Device Id".

A character string, which is described in a JSON format in order to indicate instruction contents of the instant task, is stored in the property "Notify Parameter".

A character string indicating an instruction progress status is stored in the property "Progress".

The property "Source" is not used and is blank.

When a predetermined file is necessary for executing the instant task, the master 2 stores the file in the second storage 94 as shown in S14 in FIG. 4A. In this case, information (for example, a URL) indicating a storage destination of the file is described in the property "Notify Parameter". For example, when the instant task is to update firmware in the terminal devices 4 and 5, the master 2 stores, in the second storage 94, an update file necessary for updating the firmware. In this case, for example, a storage destination URL of the update file for the firmware may be described in the property "Notify Parameter".

Figure 4B:
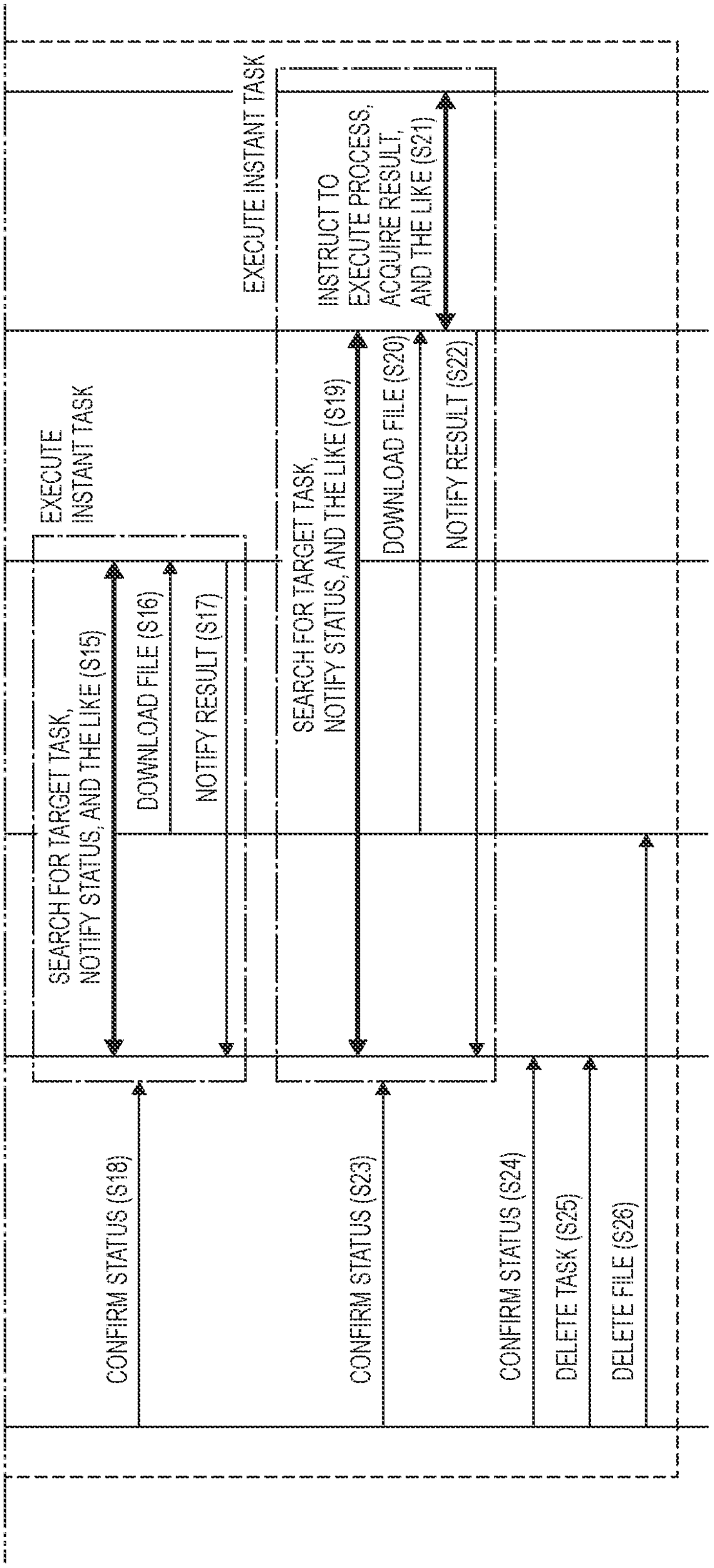

As shown in S15 in FIG. 4B, the cloud connector of the second type terminal device 5 accesses the first storage 93 of the cloud server 6 at the set polling cycle, and searches for the instant task targeted for the cloud connector. That is, the cloud connector determines whether a new entity of the instant task to be executed by the cloud connector is registered in the instant task table.

When the new entity is registered, the cloud connector rewrites a character string in the property "Progress" in the corresponding instant task entity from "request" to "processing", thereby transmitting, to the master 2, information indicating that a request for the instant task is received.

As shown in S18 in FIG. 4B, the master 2 that registers the instant task entity confirms a status of the instant task corresponding to the instant task entity. Specifically, the master 2 periodically refers to, at the set polling cycle, the instant task entity in the instant task table registered in the first storage 93. The master 2 may perform periodic reference, thereby confirming, based on the fact that a value of the property of the progress status is updated, that the request for the instant task is received.

The cloud connector of the second type terminal device 5 refers to the property "Notify Parameter" in the instant task entity when the instant task is executed. When a data file necessary for executing the instant task is present in the second storage 94, as shown in S16, the cloud connector downloads the data file from the second storage 94 based on storage destination information (for example, a URL) described in the property "Notify Parameter".

When the instant task is ended, the cloud connector of the second type terminal device 5 updates the corresponding instant task entity as shown in S17. Specifically, the cloud connector rewrites the character string in the property "Progress" in the corresponding instant task entity from "processing" to "done", thereby transmitting, to the master 2, information indicating that the execution of the instant task is completed.

As shown in S19, the client 3 accesses the first storage 93 of the cloud server 6 at the set polling cycle, and searches for an instant task targeted for the management relay target. That is, the client 3 determines whether a new entity of the instant task to be executed by the first type terminal device 4 that is the management relay target of the client 3 is registered in the instant task table. Among the first type terminal devices 4 that are the management relay targets, each of one or more first type terminal devices 4 set as an execution target of the instant task in the instant task table (that is, one or more first type terminal devices 4 corresponding to the device ID stored in the property "Device Id") is hereinafter referred to as an instant task execution target.

When the new instant task entity is registered for the instant task execution target, the client 3 rewrites a character string of the property "Progress" in the corresponding instant task entity from "request" to "processing", thereby transmitting, to the master 2, information indicating that a request for the instant task is received. Further, the client 3 refers to the property "Notify Parameter" in the instant task entity, and recognizes process contents to be executed. Then, as shown in S20, the client 3 acquires a data file necessary for executing the instant task from the second storage 94 as necessary based on the recognized process contents.

Thereafter, as shown in S21, the client 3 instructs the instant task execution target to execute the instant task via the local area network. At this time, the data file acquired from the second storage 94 is transferred to each instant task execution target. Then, the client 3 acquires an execution result of the instant task from the instant task execution target.

When the execution of the instant task is completed in all the instant task execution targets, the client 3 updates the instant task entity of the corresponding instant task execution target as shown in S22. Specifically, the client 3 rewrites the character string in the property "Progress" in the corresponding instant task entity from "processing" to "done", thereby transmitting, to the master 2, information indicating that the execution of the instant task is completed.

As confirmation of the status, as shown in S23, the master 2 refers to the instant task entity in the instant task table of the first storage 93 to know that the character string in the property "Progress" is rewritten to "done", thereby confirming that the instant task is completed, and writing a processing result into the storage unit 15.

Further, the master 2 may display the processing result on the screen of the display unit 13. When the master 2 confirms that the registered instant task is completed in all the corresponding instant task execution targets as shown in S24, the master 2 deletes the instant task entity of the instant task that is no longer necessary from the first storage 93 as shown in S25. As shown in S26, the master 2 deletes, from the second storage 94, the data file provided for the instant task (for example, the update file for the firmware).

As described above, the management system 1 may remotely control, in the base where the master 2 is installed, the terminal devices 4 and 5 used in the plurality of bases, by registering and updating the instant task entity in the first storage 93 of the cloud server 6 and transferring the data file via the second storage 94.

(4) Process Related to Setting Value File

Next, a procedure of a setting value acquisition process executed by the controller 11 of the master 2 will be described. The setting value acquisition process is a process repeatedly executed during an operation of the master 2.

Figure 7:
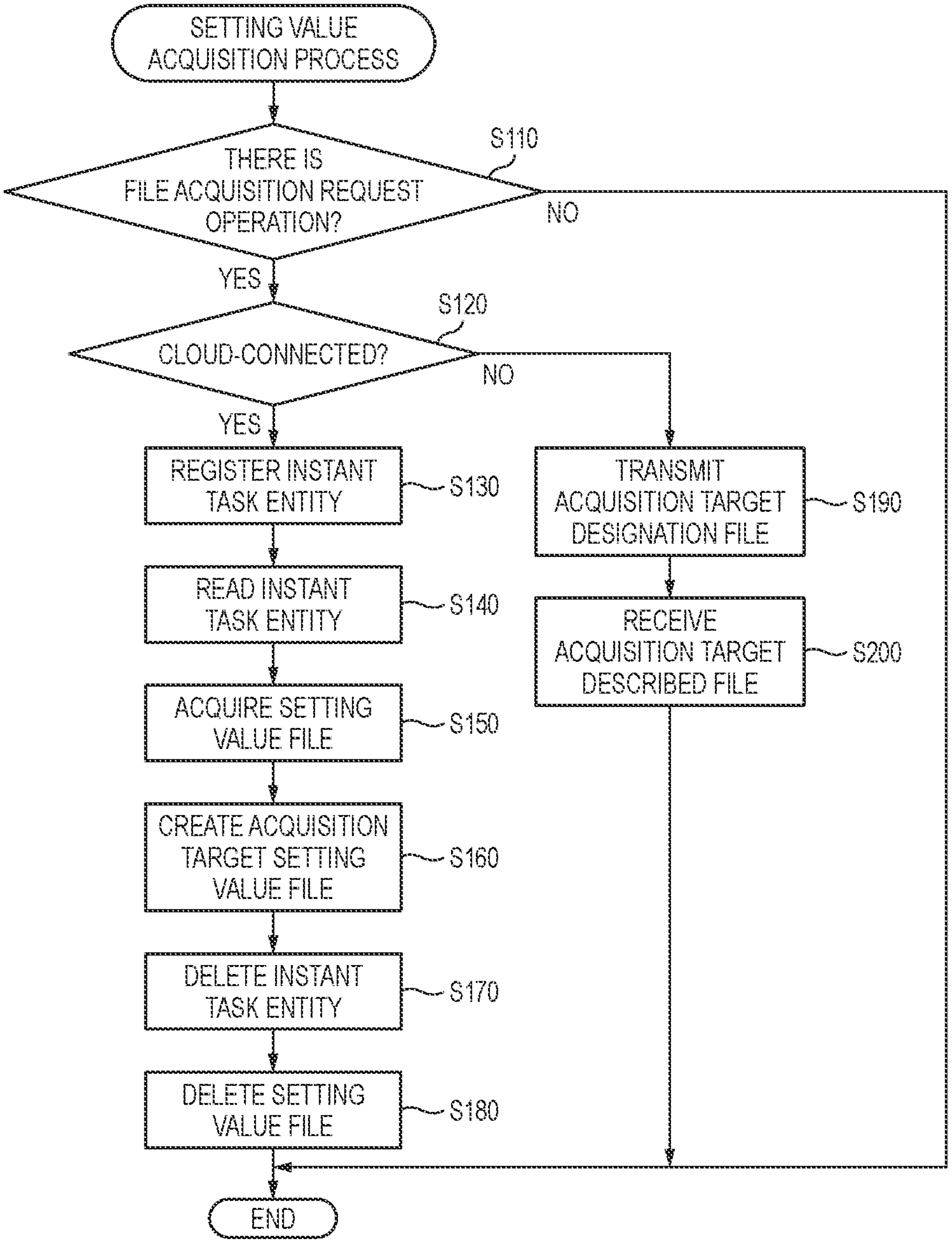
FIG. 7 is a flowchart showing a setting value acquisition process.

When the setting value acquisition process is executed, as shown in FIG. 7, the CPU 21 of the controller 11 first determines in S110 whether a file acquisition request operation of requesting acquisition of a setting value file to be described later is performed on the master 2. Specifically, the CPU 21 determines whether an operation signal indicating the file acquisition request operation is input from the input unit 14. When the operation signal indicating the file acquisition request operation is input, the CPU 21 determines that the file acquisition request operation is performed.

Here, when the file acquisition request operation is not performed, the CPU 21 ends the setting value acquisition process. On the other hand, when the file acquisition request operation is performed, in S120, the CPU 21 determines whether the terminal devices 4 and 5 (hereinafter, referred to as request target devices) serving as request targets that each create the setting value file are connected to the master 2 via the cloud server 6. The terminal devices 4 and 5 serving as the request targets that create the setting value file are set by the above file acquisition request operation.

Specifically, the first type terminal devices 4 connected to the client 3 via the local area network, and the second type terminal device 5 are terminal devices connected to the master 2 via the cloud server 6. The first type terminal devices 4 connected to the master 2 via the local area network are terminal devices that are not connected to the master 2 via the cloud server 6. Hereinafter, "connected to the master 2 via the cloud server 6" is referred to as "cloud-connected".

Here, when each of the request target devices is cloud-connected, in S130, the CPU 21 generates an instant task entity for requesting creation of the setting value file, and registers the generated instant task entity in the first storage 93.

As shown in a task instruction T3 in FIG. 6B, the instant task entity for requesting the creation of the setting value file is generated, for example, by storing a character string {"ActionType": "1", "FileOutputFile": "Folder/setting.edpk"} in the property "Notify Parameter". '"ActionType": "1"' in the task instruction T3 instructs execution of a process whose action ID is set to "1".

'"FileOutputFile": "Folder/setting.edpk"' in the task instruction T3 indicates that the setting value file is "Folder/setting.edpk". "Folder" in "Folder/setting.edpk" indicates a folder name in which the setting value file is stored in the second storage 94, and "setting.edpk" indicates a file name of the setting value file.

Next, as shown in FIG. 7, in S140, the CPU 21 first reads, at a timing when the polling cycle set in the master 2 elapses, the instant task entity registered in S130. Then, the CPU 21 refers to the property "Progress" of the read instant task entity to determine whether the creation of the setting value file is completed. Here, when the creation of the setting value file is completed, a process of S140 is ended. On the other hand, when the creation of the setting value file is not completed, the above process is repeated until the creation of the setting value file is completed.

When the process of S140 is completed, the CPU 21 acquires the setting value file from the second storage 94 in S150.

In S160, the CPU 21 creates an acquisition target setting value file to be described later by using the setting value file acquired in S150.

Then, in S170, the CPU 21 deletes, from the first storage 93 of the cloud server 6, the instant task entity registered in S130. Further, in S180, the CPU 21 deletes the setting value file stored in the second storage 94 of the cloud server 6, and ends the setting value acquisition process.

When the request target device is not cloud-connected in S120, the CPU 21 transmits an acquisition target designation file to be described later to the request target device in S190. Further, in S200, the CPU 21 receives an acquisition target described file to be described later from the request target device, and ends the setting value acquisition process.

Next, a procedure of a file creation process executed by each of the controller 31 of the client 3 and the controller 71 of the second type terminal device 5 will be described. The file creation process is a process repeatedly executed during an operation of each of the client 3 and the second type terminal device 5.

Figure 8:
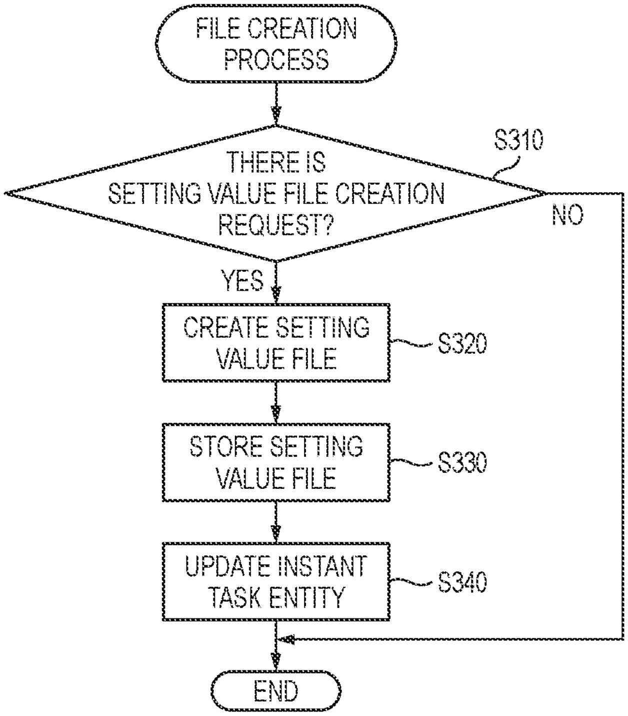
FIG. 8 is a flowchart showing a file creation process.

When the file creation process is executed, as shown in FIG. 8, each of the CPU 41 of the controller 31 and the CPU 81 of the controller 71 first determines whether there is a setting value file creation request in S310. Specifically, the CPU 41 reads an instant task entity whose request target is the first type terminal device 4 connected to the client 3 via the local area network, and refers to the property "Notify Parameter" of the read instant task entity, thereby determining whether there is the setting value file creation request. The CPU 81 reads an instant task entity whose request target is the second type terminal device 5, and refers to the property "Notify Parameter" of the read instant task entity, thereby determining whether there is the setting value file creation request.

Here, when there is no setting value file creation request, each of the CPUs 41 and 81 ends the file creation process. On the other hand, when there is the setting value file creation request, each of the CPUs 41 and 81 creates the setting value file in S320.

Specifically, the CPU 41 first requests the first type terminal device 4 that is the request target to transmit a setting value which is set for each of a plurality of setting items necessary for creating the setting value file. When the CPU 41 receives, from the first type terminal device 4, the setting value which is set for each of the plurality of setting items, the CPU 41 creates the setting value file by using the received setting value.

The CPU 81 acquires, from the memory 82, a setting value which is set for each of a plurality of setting items necessary for creating the setting value file, and creates the setting value file by using the acquired setting value.

Next, each of the CPUs 41 and 81 stores the created setting value file in the second storage 94 of the cloud server 6 in S330. Further, each of the CPUs 41 and 81 updates the instant task entity for requesting the creation of the setting value file in S340, and ends the file creation process. Specifically, each of the CPUs 41 and 81 stores the character string "done" in the property "Progress" of the instant task entity registered in the first storage 93 of the cloud server 6.

Figure 9A:
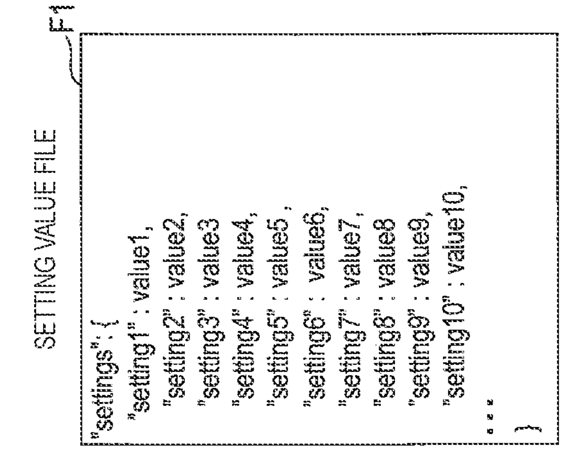
FIGS. 9A to 9D are diagrams showing configurations of a setting value file, an acquisition target setting value file, an acquisition target designation file, and an acquisition target described file.

As shown in a file F1 in FIG. 9A, the setting value file is a file in which the setting value is described for each of the plurality of setting items. "setting 1", "setting 2", . . . , "setting 10", . . . in the file F1 are the setting items. "value 1", "value 2", . . . , "value 10", in the file F1 are setting values respectively corresponding to "setting 1", "setting 2", . . . , "setting 10", . . . .

Figure 9B:
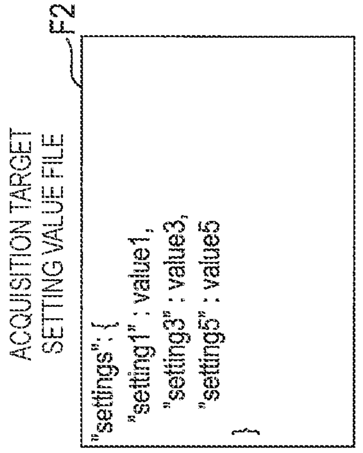

As shown in a file F2 in FIG. 9B, the acquisition target setting value file is a file obtained by extracting setting values of necessary setting items from the setting value file. "setting 1", "setting 3", and "setting 5" in the file F2 are the necessary setting items.

Figure 9C:
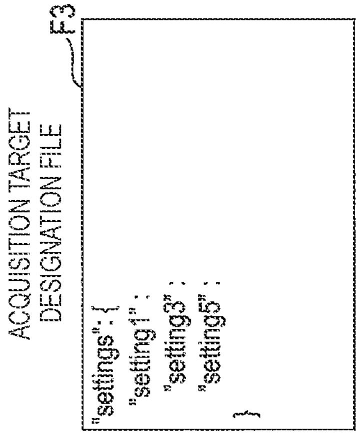

As shown in a file F3 in FIG. 9C, the acquisition target designation file is a file in which necessary setting items are described. "setting 1", "setting 3", and "setting 5" in the file F3 are the necessary setting items.

Figure 9D:
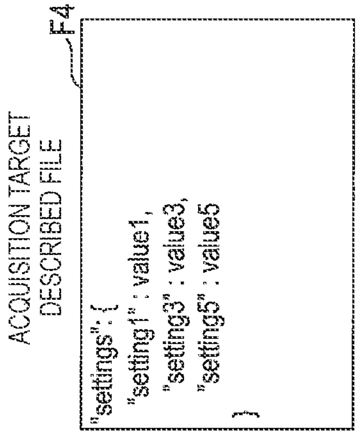

As shown in a file F4 in FIG. 9D, the acquisition target described file is a file in which setting values corresponding to the respective setting items are described in the acquisition target designation file. "value 1", "value 3", and "value 5" are setting values respectively corresponding to "setting 1", "setting 3", and "setting 5".

(5) Effects

The main management program 15*a* configured as described above causes the controller 11 included in the master 2 to execute a request registration process, a file acquisition process, and an extraction process.

The request registration process is to register, in the cloud server 6, an instant task entity for requesting, as a task, creation of a setting value file in which a setting value set in the terminal device 4 or 5 for each of a plurality of preset setting items is described.

The file acquisition process is to acquire the setting value file from the cloud server 6.

The extraction process is to extract setting values of necessary setting items from the acquired setting value file.

According to such a main management program 15*a*, an acquisition target designation file in which the necessary setting items are described does not need to be uploaded from the master 2 to the cloud server 6, and thus efficiency of data transmission is improved.

In more detail, according to the main management program 15*a*, in order to enable the master 2 to acquire the setting values of the necessary setting items, the instant task entity for requesting the creation of the setting value file only need to be registered in the first storage 93 of the cloud server 6, and the acquisition target designation file does not need to be uploaded to the second storage 94 of the cloud server 6. That is, only writing from the master 2 to the first storage 93 occurs, and writing from the master 2 to the second storage 94 is unnecessary. As a result, the main management program 15*a* reduces a communication load necessary for acquiring the setting values of the necessary setting items by the master 2.

The main management program 15*a* causes the controller 11 to further execute a connection determination process, a file transmission process, and a file reception process.

The connection determination process is to determine whether the terminal devices 4 and 5 (hereinafter, referred to as the request target devices) serving as the request targets that each create the setting value file are connected to the master 2 via the cloud server 6.

The file transmission process is to, when it is determined by the connection determination process that each of the request target devices is not connected to the master 2 via the cloud server 6, transmit, to the request target device, the acquisition target designation file in which the necessary setting items are described.

The file reception process is to receive, from the request target device, an acquisition target described file in which the setting values respectively corresponding to the setting items in the acquisition target designation file are described.

The request registration process, the file acquisition process, and the extraction process are executed when it is determined by the connection determination process that the request target device is connected to the master 2 via the cloud server 6.

According to such a main management program 15*a*, even when the terminal device 4 is directly connected to the master 2, the master 2 may acquire the setting value from the terminal device 4.

The main management program 15*a* causes the controller 11 to further execute an acquisition deletion process. The acquisition deletion process is to delete the setting value file from the cloud server 6 when the setting value file is acquired from the cloud server 6.

According to such a main management program 15*a*, the setting value file is deleted each time the master 2 acquires the setting value file. Therefore, the main management program 15*a* reduces occurrence of a situation in which the master 2 acquires the setting value from the setting value file although an actual setting value is different from the setting value in the setting value file.

SECOND EMBODIMENT

Hereinafter, a second embodiment of the present disclosure will be described with reference to the drawing. In the second embodiment, differences from the first embodiment will be described. The same components are denoted by the same reference numerals.

A management system 1 according to the second embodiment is different from the first embodiment in that a file creation process executed by the second type terminal device 5 changes.

Figure 10:
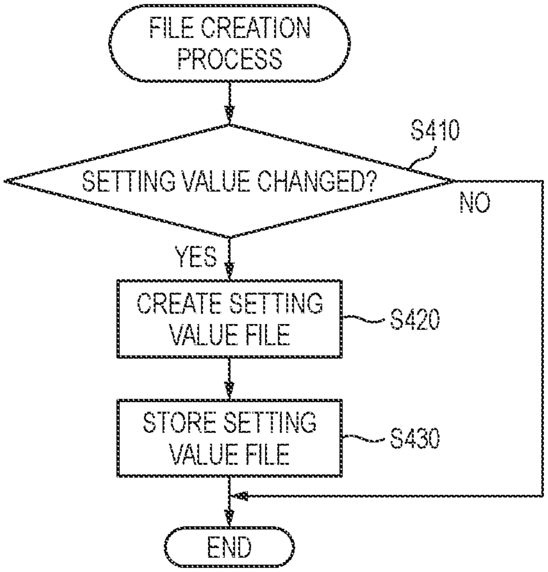
FIG. 10 is a flowchart showing a file creation process.

When the file creation process in the second embodiment is executed, as shown in FIG. 10, the CPU 81 of the controller 71 first determines whether there is a change in a setting value of at least one of a plurality of setting items necessary for creating a setting value file in S410.

Here, when the setting value does not change, the file creation process is ended. On the other hand, when the setting value changes, in S420, the CPU 81 acquires, from the memory 82, a set value which is set for each of the plurality of setting items necessary for creating the setting value file, and creates the setting value file by using the acquired setting value.

Then, in S430, the CPU 81 stores the created setting value file in the second storage 94 of the cloud server 6, and ends the file creation process.

In the management system 1 configured as described above, the second type terminal device 5 executes a file upload process. The file upload process is to create the setting value file when the setting value of at least one of the plurality of setting items changes, and upload the created setting value file to the cloud server 6.

Such a management system 1 reduces occurrence of a situation in which the master 2 acquires the setting value from the setting value file although an actual setting value is different from the setting value in the setting value file.

THIRD EMBODIMENT

Hereinafter, a third embodiment of the present disclosure will be described with reference to the drawing. In the third embodiment, differences from the first embodiment will be described. The same components are denoted by the same reference numerals.

A management system 1 according to the third embodiment is different from the first embodiment in that a setting value acquisition process changes.

Figure 11:
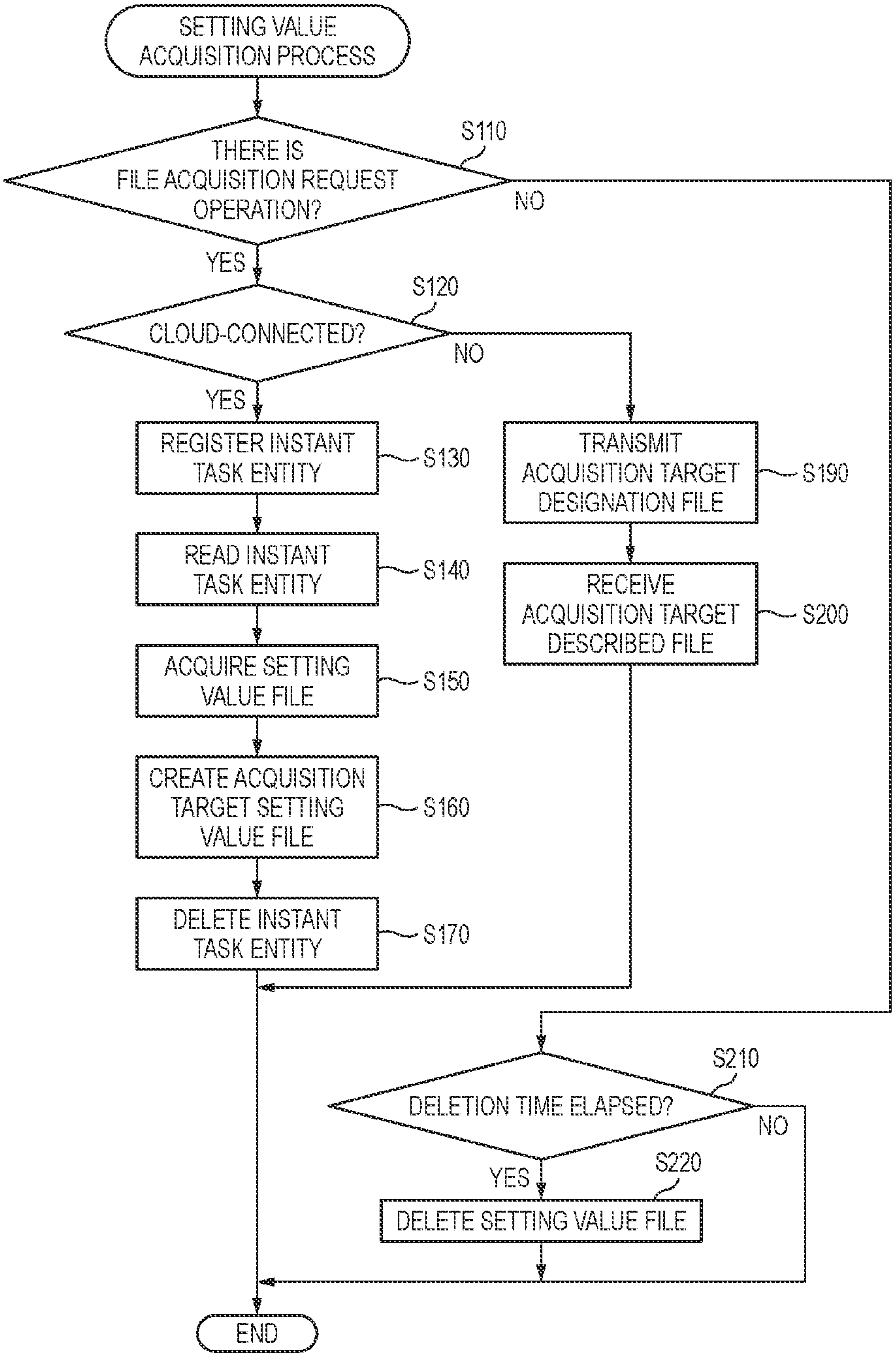
FIG. 11 is a flowchart showing a setting value acquisition process.

As shown in FIG. 11, the setting value acquisition process in the third embodiment is different from that in the first embodiment in that a process of S180 is omitted and processes of S210 and S220 are added.

That is, when a process of S170 is ended, the CPU 21 ends the setting value acquisition process.

When the file acquisition request operation is not performed in S110, the CPU 21 determines in S210 whether a preset deletion time elapses after the latest setting value file is acquired. Here, when the deletion time does not elapse, the CPU 21 ends the setting value acquisition process.

On the other hand, when the deletion time elapses, the CPU 21 deletes, in S220, the setting value file stored in the second storage 94 of the cloud server 6, and ends the setting value acquisition process.

The main management program 15*a* configured as described above causes the controller 11 included in the master 2 to further execute a time deletion process. The time deletion process is to delete the setting value file from the cloud server 6 when the preset deletion time elapses after the setting value file is acquired from the cloud server 6.

Since the setting value file is deleted after a predetermined time elapses, such a main management program 15*a* reduces occurrence of a situation in which the master 2 acquires the setting value from the setting value file although an actual setting value is different from the setting value in the setting value file.

Although an embodiment of the present disclosure has been described above, the present disclosure is not limited to the embodiment described above and may be implemented in various modifications.

For example, in the above second embodiment, a form is shown in which the second type terminal device 5 creates the setting value file when the setting value of at least one of the plurality of setting items changes and uploads the setting value file to the cloud server 6. However, after the second type terminal device 5 receives a task once from the master 2, the second type terminal device 5 may continue to create the setting value file each time the setting value changes and to upload the setting value file to the cloud server 6, and the task is used for requesting the creation of the setting value file.

A plurality of functions of one component in the embodiment described above may be implemented by a plurality of components, or one function of one component may be implemented by a plurality of components. A plurality of functions of a plurality of components may be implemented by one component, or one function to be implemented by a plurality of components may be implemented by one component. A part of a configuration of the embodiment described above may be omitted. At least a part of the configuration of the embodiment described above may be added to or replaced with a configuration of another embodiment described above.

In addition to the master 2 described above, the present disclosure may also be implemented in various forms such as a system including the master 2 as a component, a program for causing a computer to function as the master 2, a non-transitory tangible recording medium such as a semiconductor memory in which the program is recorded, and a management method.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. One or more non-transitory computer readable media storing a management program and a sub-management program to be used in a management system that manages a plurality of terminal devices, wherein the management system includes:

a storage device;

a management device configured to manage the terminal devices and communicate with the storage device;

a communication terminal device that is one of the terminal devices and configured to communicate with the storage device;

a sub-management device configured to communicate with the storage device, where the storage device is one of a cloud storage and a memory external to the management device, the sub-management device and the communication terminal device; and a connection terminal device that is one of the terminal devices and configured to communicate with the sub-management device, wherein the management device is configured to store, in the storage device, task request data for requesting one of the terminal devices to execute a task, wherein the communication terminal device is configured to, periodically access the storage device based on a set polling period and search the storage device for task request data whose request target is the communication terminal device, and in response to finding said task request data whose request target is the communication terminal device, acquire, from the storage device without communicating with the management device, said task request data whose request target is the communication terminal device, and then execute the task based on the acquired task request data, and wherein the management program is configured to cause a first controller included in the management device to execute a process including:

storing, in the storage device, task request data for requesting, as the task, creation of a setting value file which includes setting values of the one of the terminal devices corresponding to given setting items;

acquiring the setting value file from the storage device; and extracting one of the setting values corresponding to one of the given setting items from the setting value file acquired by the acquiring of the setting value file, wherein the sub-management program is configured to cause a second controller included in the sub-management device to execute a second process including, periodically accessing the storage device based on a set polling period and searching the storage device for task request data whose requested target is the connection terminal device and in response to finding said task request data whose requested target is the connection terminal device, acquiring, from the storage device, said task request data whose request target is the connection terminal device, and then executing the task based on the acquired task request data.

2. The one or more non-transitory computer readable media according to claim 1, wherein the process further includes:

determining whether a request target device, which is one of the terminal devices serving as a request target of creating the setting value file, is connected to the management device via the storage device;

in a case where the first controller determines that the request target device is not connected to the management device via the storage device, transmitting, to the request target device, an acquisition target designation file which includes the one of the given setting items; and receiving, from the request target device, an acquisition target described file which includes the setting value corresponding to the one of the given setting items in the acquisition target designation file, and wherein the storing of the task request data in the storage device, the acquiring of the setting value file from the storage device, and the extracting of the one of the setting values from the setting value file are executed in a case where the management program determines that the request target device is connected to the management device via the storage device.

3. The one or more non-transitory computer readable media according to claim 1, wherein the process further includes deleting the setting value file from the storage device when a given deletion time elapses after the acquiring of the setting value file from the storage device.

4. The one or more non-transitory computer readable media according to claim 1, wherein the process further includes deleting the setting value file from the storage device in a case where the setting value file is acquired from the storage device.

5. The one or more non-transitory computer readable media of claim 1, wherein in a case where the connection terminal device is not registered in the storage device, the task request data is to register the connection terminal device in the storage device, and the second process includes the sub-management device registering the connection terminal in the storage device.

6. The one or more non-transitory computer readable media of claim 1, wherein the sub-management device relays information from the connection terminal device to the management device via the storage device.

7. The one or more non-transitory computer readable media of claim 1, wherein the task request data causes the sub-management device to update information in the storage device associated with the connection terminal.

8. The one or more non-transitory computer readable media of claim 7, wherein the information is either log data or status data.

9. A management method to be used in a management device and a sub-management device in a management system that manages a plurality of terminal devices, wherein the management system includes:

a storage device;

the management device configured to communicate with the storage device;

a communication terminal device that is one of the terminal devices and configured to communicate with the storage device;

the sub-management device configured to communicate with the storage device, where the storage device is one of a cloud storage and a memory external to the management device, the sub-management device and the communication terminal device; and a connection terminal device that is one of the terminal devices and configured to communicate with the sub-management device, wherein the management device is configured to store, in the storage device, task request data for requesting one of the terminal devices to execute a task, wherein the communication terminal device is configured to, periodically access the storage device based on a set polling period and search the storage device for task request data whose request target is the communication terminal device, and in response to finding said task request data whose request target is the communication terminal device, acquire, from the storage device without communicating with the management device, said task request data whose request target is the communication terminal device, and then execute the task based on the acquired task request data, and wherein the management method comprises:

storing, in the storage device, task request data for requesting, as the task, creation of a setting value file which includes setting values of the one of the terminal devices corresponding to given setting items;

periodically accessing the storage device based on a set polling period and searching the storage device for task request data whose requested target is the connection terminal device and in response to finding said task request data whose requested target is the connection terminal device, acquiring, from the storage device, said task request data whose request target is the connection terminal device, and then executing the task based on the acquired task request data;

acquiring the setting value file from the storage device; and extracting one of the setting values corresponding to one of the given setting items from the setting value file acquired by the acquiring of the setting value file.

10. A management system managing a plurality of terminal devices and comprising:

a storage device;

a management device comprising a first controller, the management device configured to manage the terminal devices and communicate with the storage device; and a communication terminal device that is one of the terminal devices, the communication terminal device comprising a first terminal controller, the communication terminal device configured to communicate with the storage device;

a sub-management device comprising a second controller, the sub-management device configured to communicate with the storage device, where the storage device is one of a cloud storage and a memory external to the management device, the sub-management device and the communication terminal device; and a connection terminal device that is one of the terminal devices, the connection terminal device comprising a second terminal controller and the connection terminal device is configured to communicate with the sub-management device, wherein the management device is configured to store, in the storage device, task request data for requesting one of the terminal devices to execute a task, wherein the communication terminal device is configured to, periodically access the storage device based on a set polling period and search the storage device for task request data whose request target is the communication terminal device, and in response to finding said task request data whose request target is the communication terminal device, acquire, from the storage device without communicating with the management device, said task request data whose request target is the communication terminal device, and then execute the task based on the acquired task request data, and wherein the management device is configured to execute:

registering, in the storage device, task request data for requesting, as the task, creation of a setting value file which includes setting values of the one of the terminal devices corresponding to given setting items;

acquiring the setting value file from the storage device; and extracting one of the setting values corresponding to one of the given setting items from the setting value file acquired, wherein the sub-management device is configured to execute:

periodically accessing the storage device based on a set polling period and searching the storage device for task request data whose requested target is the connection terminal device and in response to finding said task request data whose requested target is the connection terminal device, acquiring, from the storage device, said task request data whose request target is the connection terminal device, and then executing the task based on the acquired task request data.

11. The management system according to claim 10, wherein the communication terminal device is configured to execute the creating of the setting value file in a case where the setting value of at least one of the plurality of setting items changes, and then uploading the created setting value file to the storage device.

* * * * *